United States Patent
Nemoto (10) Patent No.: US 6,621,775 B1
(45) Date of Patent: Sep. 16, 2003

(54) OPTICAL HEAD, OPTICAL RECORDING AND/OR REPRODUCING APPARATUS, AND TRACKING ERROR SIGNAL DETECTING METHOD

(75) Inventor: Kazuhiko Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/234,445

(22) Filed: Jan. 21, 1999

(30) Foreign Application Priority Data

Jan. 22, 1998 (JP) .......................................... P10-010677

(51) Int. Cl.⁷ ............................................... G11B 7/00
(52) U.S. Cl. ................... 369/44.37; 369/116; 369/44.12
(58) Field of Search .......................... 369/44.37, 44.38, 369/94, 58, 112, 44.12, 44.23, 44.27, 44.31, 116

(56) References Cited

U.S. PATENT DOCUMENTS

| | | | | |
|---|---|---|---|---|
| 5,033,040 A | * | 7/1991 | Fujita | 369/44.37 |
| 5,144,614 A | * | 9/1992 | Kume et al. | 369/112.28 |
| 5,222,055 A | * | 6/1993 | Fujita | 369/44.37 |
| 5,235,581 A | * | 8/1993 | Miyagawa et al. | 369/112 |
| 5,493,554 A | * | 2/1996 | Sasaki et al. | 369/112.17 |
| 5,729,510 A | * | 3/1998 | Kasahara et al. | 369/44.27 |
| 5,793,734 A | * | 8/1998 | Tsuchiya et al. | 369/44.23 |
| 5,875,167 A | * | 2/1999 | Katayama | 369/112 |
| 5,912,868 A | * | 6/1999 | Hayashi et al. | 369/94 |
| 5,956,312 A | * | 9/1999 | Ishihara | 369/112 |
| 6,034,939 A | * | 3/2000 | Takasawa et al. | 369/44.23 |

FOREIGN PATENT DOCUMENTS

JP          07182712 A    *   7/1995

* cited by examiner

*Primary Examiner*—Thang V. Tran
(74) *Attorney, Agent, or Firm*—Rader, Fishman & Grauer PLLC; Ronald P. Kananen, Esq.

(57) ABSTRACT

An optical head comprises a first optical system which irradiates a light of a first wavelength towards the information recording medium and detects a return part of the light reflected by the information recording medium, and a second optical system which irradiates a light of a second wavelength shorter than the first wavelength towards the information recording medium and detects a return part of the light reflected by the information recording medium. When writing or reading information with respect to the information recording medium using the second optical system, a pushpull signal is detected by the second optical system, and an offset component of the pushpull signal is canceled by a signal detected by the first optical system.

13 Claims, 10 Drawing Sheets

OPTICAL HEAD, OPTICAL RECORDING AND/OR REPRODUCING APPARATUS, AND TRACKING ERROR SIGNAL DETECTING METHOD

BACKGROUND OF THE INVENTION

1. Field of the Invention

The present invention relates to an optical head including a plurality of optical systems in which light beams of different wavelengths are used, and an optical recording and/or reproducing apparatus using the optical head. The present invention also concerns a tracking error signal detecting method using a plurality of optical systems.

2. Description of Related Art

During data recording and reproduction by an optical head with respect to information recording media, tracking error signal is detected as will be briefly described below concerning CD-ROM, DVD-ROM and recordable DVD, by way of example, as information recording media.

CD-ROM is a read-only digital optical disc. A light having a wavelength $\lambda$ of 780 nm is used to read data from the CD-ROM. DVD-ROM is a read-only digital optical disc designed for a higher recording density and larger storage capacity than CD-ROM. A light of about 635 nm or 650 nm in wavelength $\lambda$ is used for data read-out from DVD-ROM.

In addition to the conventional DVDs, a recordable digital optical disc has been proposed which is designed to have a higher recording density and larger storage capacity than CD-ROM. For data write and read-out with respect to this recordable DVD, a light having a wavelength $\lambda$ of about 635 nm or 650 nm is used. It should be noted that the recordable DVD includes mainly a one with respect to which data can be written but cannot be erased and a one with respect to which data can be written and also erased. These types of DVD will be generally called "recordable DVD" herein below.

For detection of tracking error signal in data read-out from CD-ROM, a pushpull signal detected by the pushpull method is used. The pushpull method is advantageous in that the optical system may be simple. On the other hand, however, it is disadvantageous in that a large offset takes place due to a lens shift, disc radial skew, and so forth. For the optical system for CD-ROM, the offset component has to be canceled through a correction by a processing circuit provided for the purpose.

That is, for use of the pushpull method, a correction circuit is necessary to cancel the offset component. It should be noted that the correction circuit will be referred to as "pushpull offset correction circuit" in the following description. In the conventional optical head, the pushpull offset correction circuit is incorporated in PDIC in the optical head. PDIC is an integration of a photodiode (PD) provided to detect a return light from the disc and an integrated circuit (IC) in which the light detection signal from the photodiode is processed in a predetermined manner.

Note that the read-only optical disc such as CD-ROM has pits formed on the recording surface thereof The pushpull signal cannot be detected if the pit is too deep. However, since the pit depth is prescribed to be about $\lambda/5$ for CD-ROM, the pushpull signal can surely be detected from CD-ROM.

On the other hand, the pit depth is prescribed to be about $\lambda/4$ for DVD-ROM. In this case, no pushpull signal can be detected. For detection of tracking error signal from DVD-ROM, for example, the heterodyne method is to be adopted. The heterodyne method is also called DPD (differential phase detection) method and a differential phase can be effected with a generally similar optical system to that in the optical head for the conventional CD-ROM. For the heterodyne method, however, the light detection signal has to be processed in a complicated manner by a processing circuit. In the following description, the circuit to effect this processing will be referred to as a "heterodyne detection circuit"

It should be noted however that the heterodyne method cannot be used for optical discs having no intensity modulation in the track direction, namely, which has no data written thereon. Therefore, the heterodyne method can be employed for optical discs having data previously written thereon such as DVD-ROM, but not suitable for use with any recordable optical discs.

However, it has been earnestly desired that DVD-ROM and recordable DVD are interchangeable with each other so that a single disc drive can be commonly used with them. In this situation, an optical disc has been proposed which can detect a tracking error signal by the heterodyne method when reading a DVD-ROM and by the pushpull method when writing or recording a recordable DVD. With such an optical head in a disc drive, it is possible to detect a tracking error signal in both DVD-ROM and recordable DVD so that DVD-ROM and recordable DVD are interchangeable with each other and selectively playable in the same disc drive.

Generally, a recordable DVD has grooves formed on the recording surface thereof. However, no pushpull signal can be detected if the grooves are too deep. However, if the groove depth is prescribed to be about $\lambda/8$, pushpull signal can be detected without any problem.

With an optical head in which, to detect a tracking error signal, the heterodyne method is used for DVD-ROM while the pushpull method is employed for recordable DVD, a problem will arise that the processing circuit to process the light detection signal is rather complicated.

As mentioned above, a heterodyne detection circuit is indispensable for the complicated processing of the light detection signal when the heterodyne method is used, and a pushpull offset correction circuit is required to cancel offset component when the pushpull method is used. Therefore, for adoption of the heterodyne method for DVD-ROM and the pushpull method for recordable DVD, both the heterodyne detection circuit and pushpull offset correction circuit are required.

It is rather difficult to build both these circuits together in PDIC. Even if it is possible, a PDIC incorporating both the circuits will have a very large physical size. Therefore, it is desirable that a tracking error signal can be detected from both DVD-ROM and recordable DVD without any complicated processing circuit.

In the foregoing, the tracking error signal detection has been described concerning a one-spot method in which a single light beam is irradiated onto a disc. However, there is also available a so-called three-beam method (also called "twin-spot method") in which three light beams are irradiated onto a disc to detect a tracking error signal.

Figure 1:
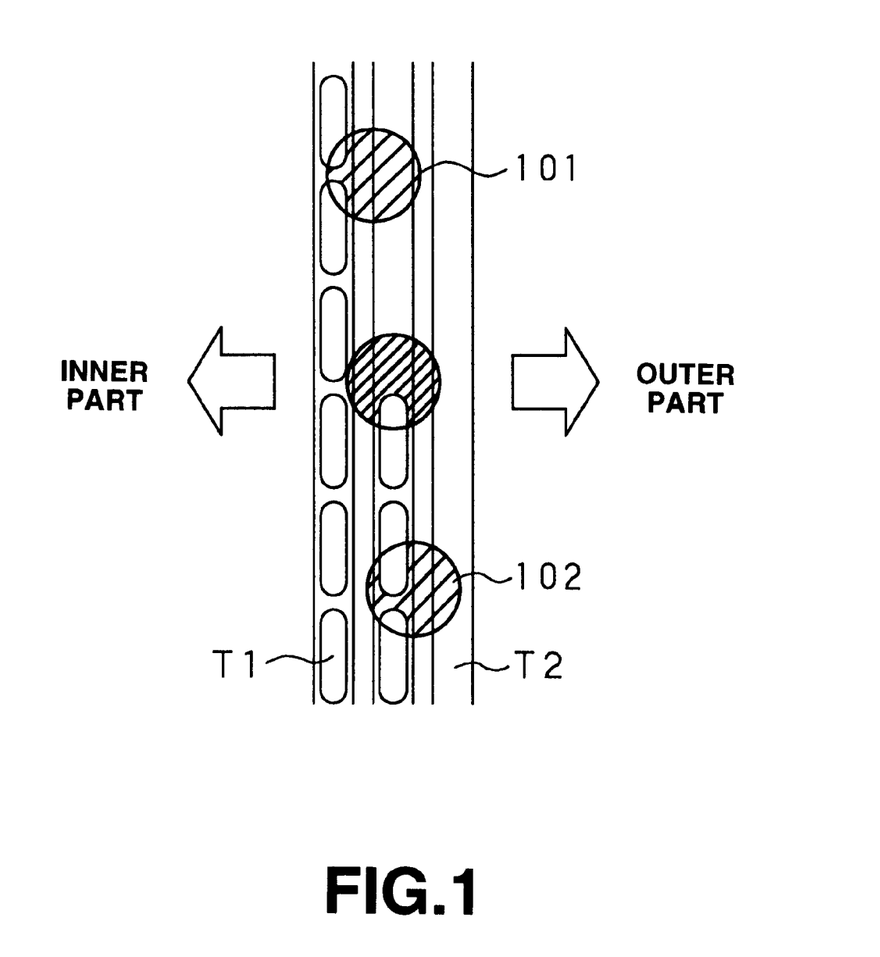
FIG. 1 explains the problems encountered in detection of tracking error signal by the three-beam method, showing three light spots defined on a track when writing a new data.

FIG. 1 explains the possible problems encountered in detection of tracking error signal by the three-beam method, showing three light spots defined on a track when writing a new data.

When writing data initially into an area where no data is written on a recordable DVD, if the track pitch is very small as compared with the spot diameter, one side spot 101 will be positioned on a track T1 where data is already written while the other side spot 102 will be positioned on a track T2 where no data is written, as shown in FIG. 1. In this situation, the signal from the one side spot 101 and that from the other light spot 102 will be asymmetrical with each other so that no tracking error signal will be detected. Therefore, if the track pitch is extremely small in comparison with the spot diameter as in recordable DVD, the three-beam method cannot be adopted for the detection of tracking error signal.

In recordable DVD, the track pitch is very small, namely, less than a half of that in CD-ROM. Therefore, when the three-beam method is used for detection of a tracking error signal from DVD-ROM and recordable DVD, it is extremely difficult to align the optical head with a high accuracy. That is, since the track pitch in DVD-ROM and recordable DVD is very small, it is necessary to set, with a sufficiently high accuracy, an angle defined between the orientation of the three spots and the track, and thus it is necessary to align the optical head with a considerably improved accuracy. From this point of view, it is not desirable to adopt the three-beam method for detection of tracking error signal from DVD-ROM and recordable DVD.

SUMMARY OF THE INVENTION

It is therefore an object of the present invention to provide an optical head adapted to detect a tracking error signal from each of a plurality of different types of recording medium designed for high recording density and large capacity without using any complicated processing circuit.

It is another object of the present invention to provide an optical recording and/or reproducing apparatus using the optical head.

It is further objects of the present invention to provide a tracking error signal detecting method using the optical head.

The above object can be attained by providing an optical head in which a light is irradiated towards an information recording medium and a return light from the information recording medium is detected, comprising, according to the present invention:

a first optical system which irradiates a light of a first wavelength towards the information recording medium and detects a return part of the light reflected by the information recording medium; and a second optical system which irradiates a light of a second wavelength shorter than the first wavelength towards the information recording medium and detects a return part of the light reflected by the information recording medium;

when writing or reading information with respect to the information recording medium using the second optical system, a pushpull signal being detected by the second optical system, and an offset component of the pushpull signal being canceled by a signal detected by the first optical system.

In the optical head according to the present invention, the second optical system is used to detect a pushpull signal and an offset component of the pushpull signal is canceled by the signal detected by the first optical system. Therefore, a pushpull signal whose offset component is canceled can be obtained with no pushpull offset correction circuit provided in the second optical system to cancel the offset component of the pushpull signal.

Note that the optical head may comprise an objective lens to condense light onto the information recording medium. The objective lens should preferably be usable in common by both the first and second optical systems. Thereby, the optical systems as a whole can be designed to be compact.

Also, the first and second optical systems of the optical head may each comprise an objective lens to condense light onto the information recording medium. In this case, these objective lenses should preferably be installed on a common lens driving means adapted to drive the objective lenses together. Thereby, even with the respective objective lenses of the first and second optical systems, the first optical system can be used to positively detect a necessary signal for canceling an offset component of a pushpull signal detected by the second optical system.

The above object can also be attained by providing an optical recording and/or reproducing apparatus in which light beams of first and second wavelengths are irradiated towards an information recording medium and a return light from the information recording medium is detected, comprising, according to the present invention:

a first optical system which irradiates a light of the first wavelength towards a first information recording medium and detects a return part of the light reflected by the first information recording medium to write and/or read information with respect to the first information recording medium; and a second optical system which irradiates a light of the second wavelength shorter than the first wavelength towards a second information recording medium having a higher recording density than the first information recording medium and detects a return part of the light reflected by the second information recording medium to write and/or read information with respect to the second information recording medium;

when writing or reading information with respect to the second information recording medium using the second optical system, a pushpull signal of the return part of the light reflected by the second information recording medium being detected by the second optical system, and an offset component of the pushpull signal being canceled based on a signal of detection, by the first optical system, of the return part of the light reflected by the second information recording medium.

The above object can also be attained by providing a tracking error signal detecting method, comprising, according to the present invention, the steps of:

irradiating a light of a predetermined wavelength towards an information recording medium and detecting a return part of the light reflected by the information recording medium, by a first optical system;

irradiating a light of a shorter wavelength than that of the light used in the first optical system towards the information recording medium and detecting a return part of the light reflected by the information recording medium, by a second optical system;

detecting a pushpull signal as a tracking error signal by the second optical system; and canceling an offset component of the pushpull signal with a signal detected by the first optical system.

In the tracking error signal detecting method according to the present invention, a pushpull signal is detected by the second optical system and an offset component of the pushpull signal is canceled with a signal detected by the first optical system. Therefore, a pushpull signal whose offset component is canceled can be obtained with no pushpull offset correction circuit provided in the second optical system to cancel the offset component of the pushpull signal.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 7 consisting of FIGS. 7A through 7B, shows a photodetector provided in the light integration device for use in the DVD-oriented light integration unit;

FIG. 9 consisting of FIGS. 9A through 9B, shows a photodetector provided in the light integration device for use in the CD-oriented light integration unit;

DETAILED DESCRIPTION OF THE PREFERRED EMBODIMENTS

Figure 2:
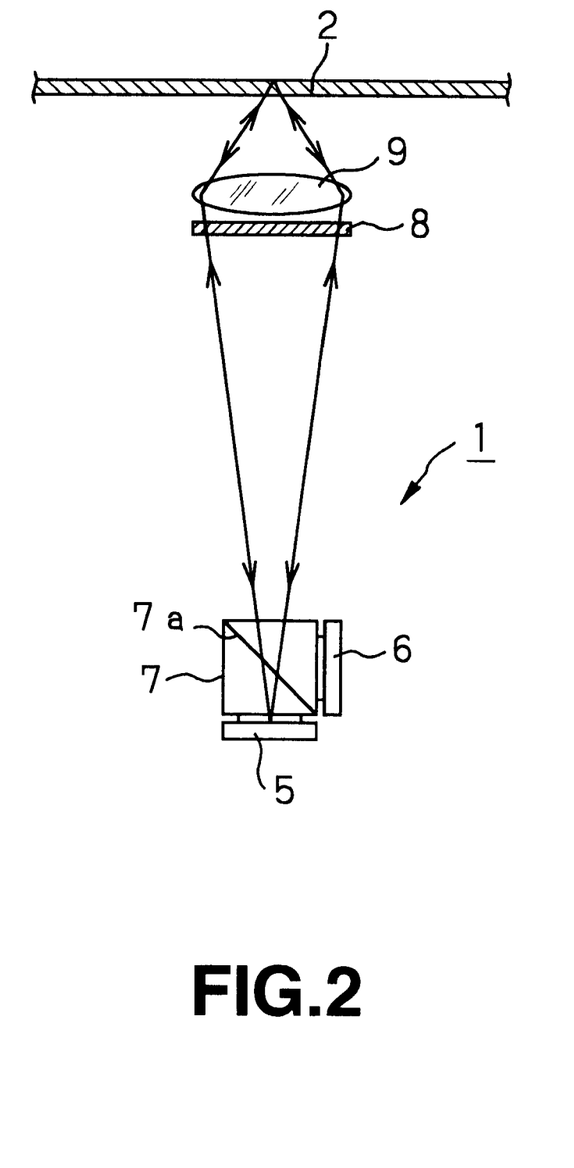
FIG. 2 shows an embodiment of the optical head according to the present invention in data read-out from a DVD-ROM.
Figure 3:
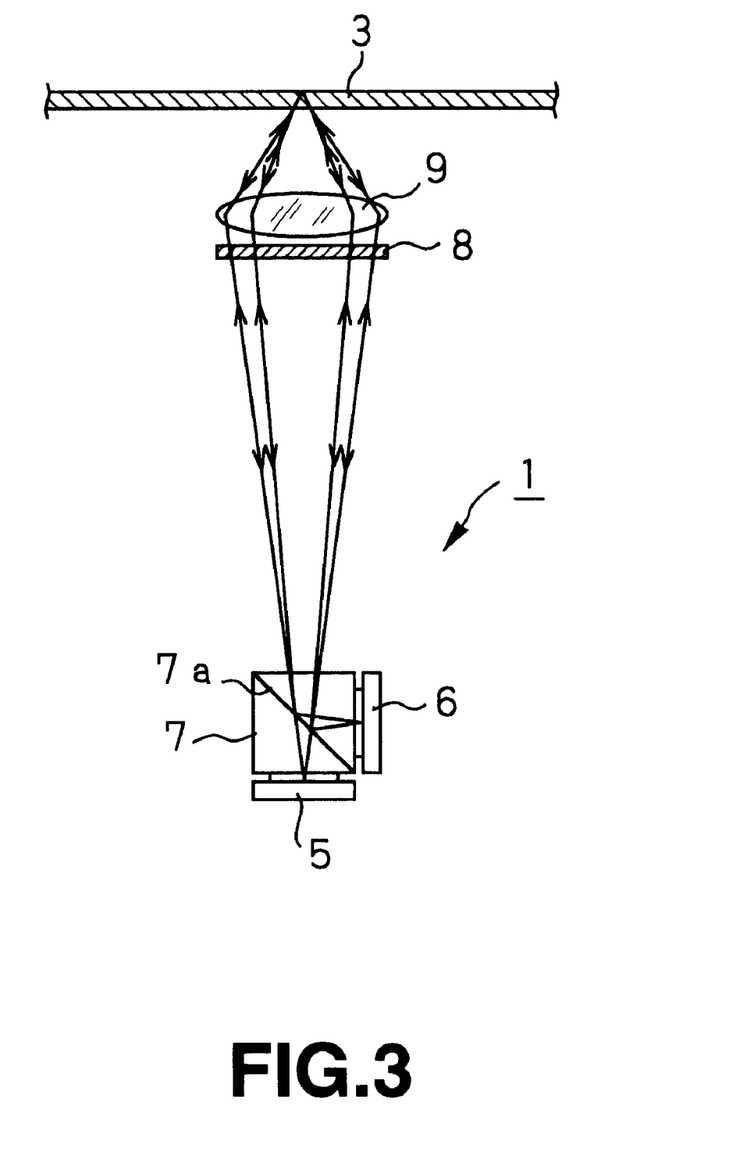
FIG. 3 shows the optical head in FIG. 2 in writing and reading a recordable DVD.
Figure 4:
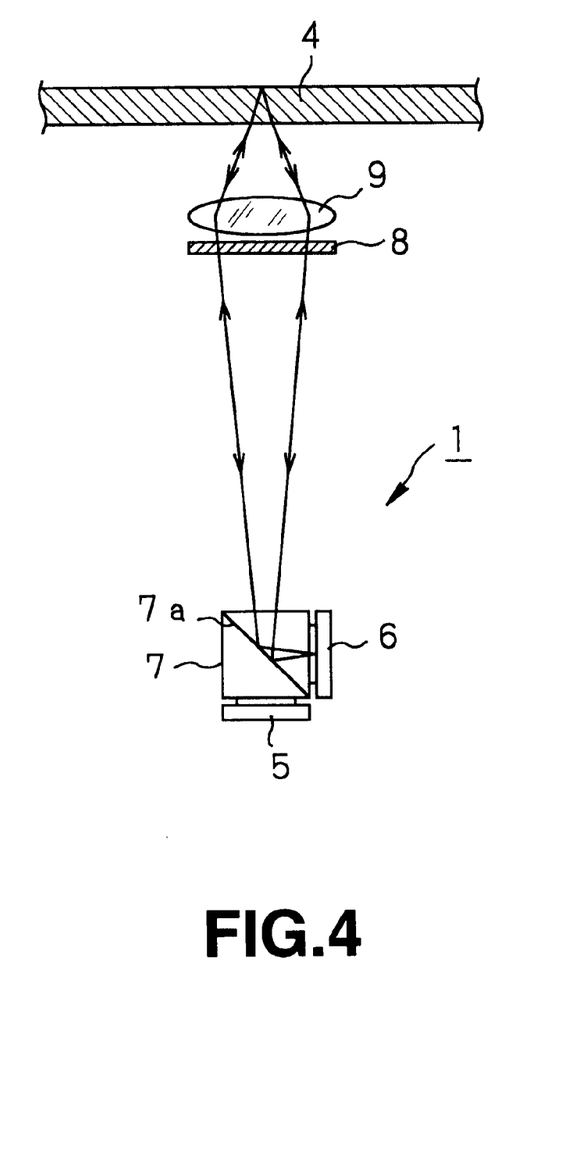
FIG. 4 shows the optical head in FIG. 2 in writing and reading a CD.

Referring now to FIGS. 2 through 4, there is illustrated the embodiment of the optical head according to the present invention. The optical head is generally indicated with a reference 1. This optical head 1 is usable in common with CD-ROM, CD-R, DVD-ROM and recordable DVD (these are digital optical discs). However, it should be noted that the present invention can also be used with other types of optical discs than these optical discs.

CD-ROM is a read-only digital optical disc. For data read-out from CD-ROM, a light having a wavelength $\lambda 0$ of about 780 nm is used. CD-R is a digital optical disc which is recordable but not erasable. For data write and read with respect to CD-R, a light of about 780 nm in wavelength $\lambda$ is used. CD-ROM and CD-R will collectively be referred to as "CD" in the following description.

DVD-ROM is a read-only digital optical disc designed for a higher recording density and larger storage capacity than CD. For data read-out from DVD-ROM, a light having a wavelength $\lambda$ of about 650 nm is used. Recordable DVD is also a digital optical disc designed from a higher recording density and larger storage capacity than CD. However, this is recordable. Data writing and reading with respect to this recordable DVD uses a light having a wavelength $\lambda$ of about 650 nm. The recordable DVDs include a one in which data can be written but cannot be erased, and a one in which data can be written and erased. In the following description, DVD-ROM and recordable DVD will collectively be referred to as "DVD".

Of FIGS. 2 to 4 showing the optical head 1, FIG. 2 shows an optical disc 2 being a DVD-ROM from which data is being read out. FIG. 3 shows an optical disc 3 being a recordable DVD with respect to which data is being written/read. FIG. 4 shows an optical disc 4 being a CD with respect to which data is being written/read.

As shown in FIGS. 2 to 4, the optical head 1 comprises a light integration unit 5 destined for use to write/read DVD, a light integration unit 6 destined for use to write/read CD, a wavelength-selective bean splitter 7 on which the DVD light integration unit 5 and CD light integration unit 6 are installed, a wavelength-selective diaphragm 8, and an objective lens 9.

For data write and read-out with respect to a DVD, the DVD light integration unit 5 irradiates a laser light having a wavelength $\lambda$ of about 650 nm and detects a return part of the laser light reflected back by DVD. The DVD light integration unit 5 comprises a heterodyne detection circuit. For data write and read-out with respect to a CD, the CD light integration unit 6 irradiates a laser light of about 780 nm in wavelength and detects a return part of the laser light reflected back by the CD. The CD light integration unit 6 comprises a pushpull offset correction circuit. The DVD and CD light integration units 5 and 6 are installed on predetermined surfaces, respectively, of the wavelength-selective beam splitter 7.

The wavelength-selective beam splitter 7 has a beam splitting surface 7a which allows the laser light of the wavelength $\lambda$ of 650 nm to pass through and reflects the laser light of the wavelength $\lambda$ of 780 nm. Thus, the wavelength-selective beam splitter 7 is disposed to allow the laser light ($\lambda$=650 nm) irradiated from the DVD light integration unit 5 to pass through and guide it to the objective lens 9 while reflecting the laser light ($\lambda$=780 nm) irradiated from the CD light integration unit 6 and guiding it to the objective lens 9.

The objective lens 9 condenses the light irradiated from the DVD light integration unit 5 onto the recording surface of the DVD as shown in FIGS. 2 and 3, and also condenses the light irradiated from the CD light integration unit 6 onto the recording surface of the CD as shown in FIGS. 3 and 4. The objective lens 9 is moved, by an objective lens drive mechanism (not shown), in the direction of the optical axis during focus servo control, and in a direction perpendicular to the optical axis during tracking servo control.

The objective lens 9 is basically designed for use with DVD, but it is also used for data write/read with respect to CD. Note that since the performance requirement for DVD designed for a high recording density and large storage capacity are generally stricter than that for CD, the objective lens 9 designed for DVD can be used with CD without any problem.

However, the transparent substrate of DVD is about 0.6 mm thick, while that of CD is about 1.2 mm thick. Therefore, if the objective lens 9 designed for DVD is used as it is when writing/reading CD, a large aberration will take place. To avoid this, the optical head 1 has the wavelength-selective diaphragm 8 disposed in front of the objective lens 9.

The wavelength-selective diaphragm 8 allows a light of about 650 nm in wavelength $\lambda$ to wholly pass through. Concerning a light of 780 nm in wavelength $\lambda$, the diaphragm 8 allows only a part of the light in the proximity of the optical axis thereof to pass while blocking the part of the light near the outer periphery thereof. Therefore, in the optical head 1, the aperture of the objective lens 9 is wholly used for the laser light (λ=650 nm) irradiated from the DVD light integration unit 5, but it is limited for the laser light (λ=780 nm) irradiated from the CD light integration unit 6. Thus, when the CD light integration unit 6 is used, the NA (numerical aperture) of the objective lens 9 is 0.45, for example.

Use of the wavelength-selective diaphragm 8 permits to minimize the aberration even when the objective lens 9 designed for use with DVD is used for data write or read-out with respect to CD. Thus, data can be written into or read from CD accurately.

Next, the DVD light integration unit 5 and CD light integration unit 6 used in the optical head 1 will be discussed further below.

Figure 5:
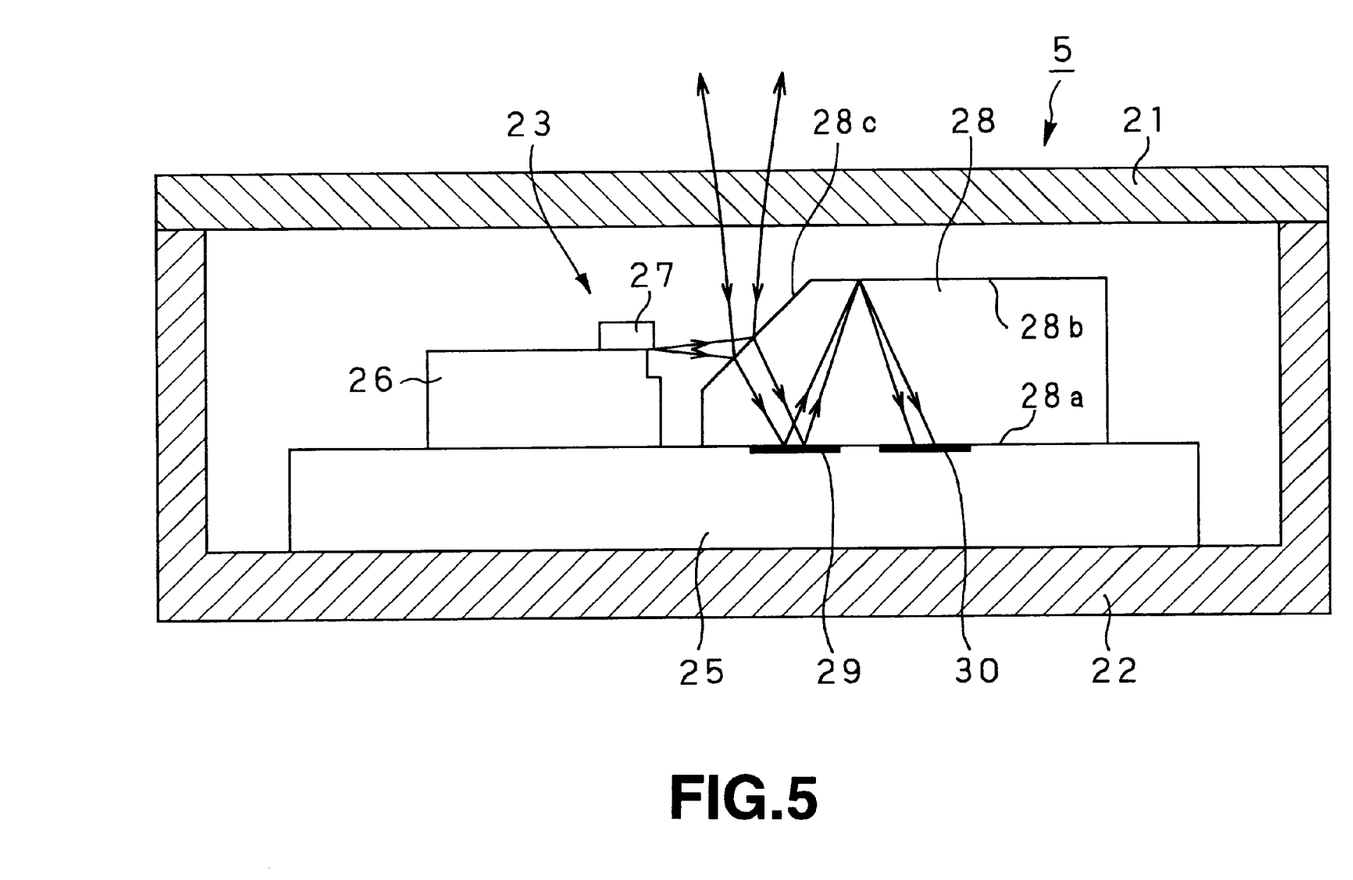
FIG. 5 is a side elevation of the DVD-oriented light integration unit for use in the optical head in FIG. 2.

As shown in FIG. 5, the DVD light integration unit 5 includes a light integration device 23 disposed inside a package 22 sealed at the top thereof with a glass cover 21. As will be seen from FIGS. 5 and 6, the light integration device 23 comprises a first semiconductor substrate 25, a second semiconductor substrate 26 mounted on the first semiconductor substrate 25, and a semiconductor laser 27 mounted on the second semiconductor substrate 26.

The semiconductor laser 27 irradiates a laser light having a wavelength λ of 650 nm when writing or reading DVD. The second semiconductor substrate 26 has a photodetector 26a (see FIG. 6) provided therein to detect the intensity of a laser light irradiated from the back of the semiconductor laser 27. The DVD light integration unit 5 adjust the intensity of laser light irradiated from the semiconductor laser 27 based on the light intensity detected by the photo-detector 26a.

Figure 6:
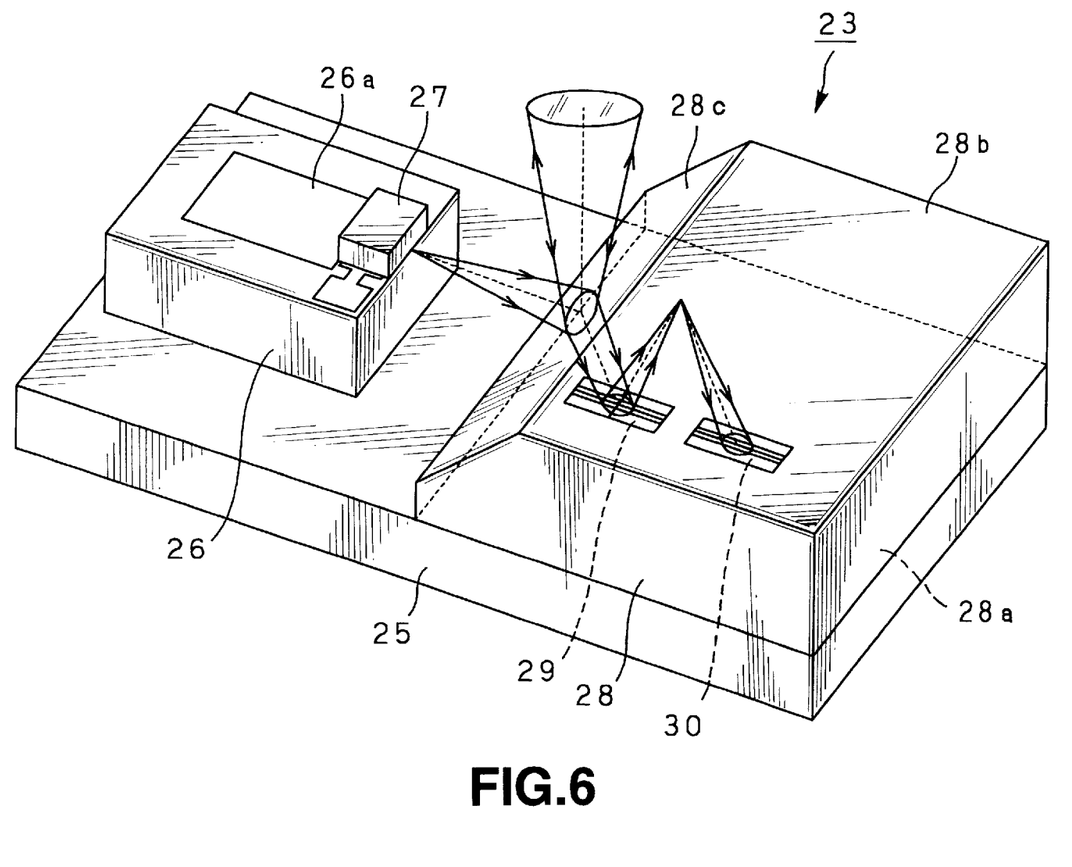
FIG. 6 is a perspective view of a light integration device for use in the DVD-oriented light integration unit.

Also a prism 28 is provided on the first semiconductor substrate 25 before the semiconductor laser 27. The prism 28 has a bottom surface 28a opposite to the first semiconductor substrate 25 and a top surface 28b opposite to the bottom surface 28a. The bottom and top surfaces 28a and 28b are parallel to each other. The top surface 28b has a light reflective layer provided thereon.

Of the prism 28, a surface upon which a laser light irradiated from the semiconductor laser 27 is incident is an optical path turning surface 28c inclined about 45° with respect to the optical axis of the laser light irradiated from the semiconductor laser 27. The optical path turning surface 28c has formed thereon a translucent layer made of a dielectric multi-layer film. The laser light irradiated from the semiconductor laser 27 is reflected by the optical path turning surface 28c having the translucent layer. The light reflected by the optical path turning surface 28c is irradiated onto the recording surface of DVD through the wavelength-selective beam splitter 7, wavelength-selective diaphragm 8 and objective lens 9. A return part of the light reflected back from the recording surface of DVD passes through the translucent layer and enters into the prism 28 from the optical path turning surface 28c.

The return light into the prism 28 from the optical path turning surface 28c first arrives at the bottom surface 28a of the prism 28. There is provided the translucent layer in the position where the return light from the optical path turning surface 28c is first incident. A photodetector 29 is provided below the translucent layer and above the first semiconductor substrate 25. Namely, the return part of the incident light into the prism 28 from the optical path turning surface 28c is partially passed through the translucent layer formed on the bottom surface 28a of the prism 28 and incident upon the first photodetector 29 while the rest of the return light part is reflected by the translucent layer towards the top surface 28b of the prism 28.

The return light reflected at the translucent layer formed on the bottom surface 28a of the prism 28 is reflected by the top surface 28b of the prism 28 on which a light reflective layer is formed, arrives at the bottom surface 28a of the prism 28 again, and travels from the bottom surface 28a of the prism 28 onto the first semiconductor substrate 25. There is provided on the upper surface of the first semiconductor substrate 25 a second photodetector 30 upon which the return light from the bottom surface 28a of the prism 28 is incident.

Figure 7A:
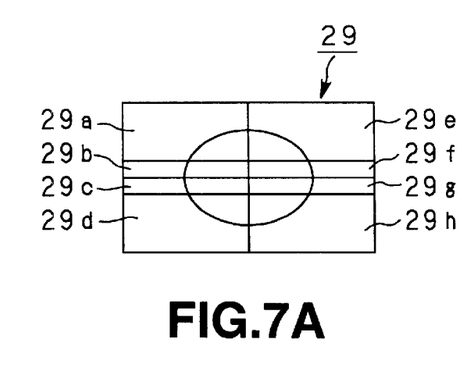
Figure 7B:
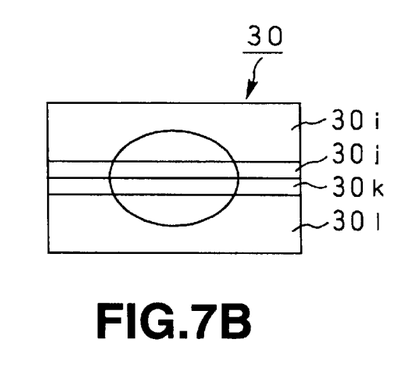

As shown in FIG. 7(A), the light-incident surface of the first photodetector 29 consists of eight parts 29a to 29h. The light-incident surface of the second photodetector 30 is formed from four parts 30i to 30l as shown in FIG. 7(B). Thus, each of such surface parts of the first and second photodetectors 29 and 30 generates a light detection signal corresponding to the intensity of an incident return light.

Further the DVD light integration unit 5 incorporates in the first semiconductor substrate 29 thereof an IC which processes, in a predetermined manner, a light detection signal generated by the first and second photodetectors 29 and 30. In the DVD light integration unit 5, the IC incorporated in the first semiconductor substrate 25 will process, in the predetermined manner, the light detection signal supplied from the first and second photodetectors 29 and 30 to generate a necessary signal for focus and tracking servo control. Also, the IC will generate a read-out signal when reading DVD.

Assume here that the light-incident surface parts 29a, 29b, 29c, 29d, 29e, 29f, 29g and 29h and 30i, 30j, 30k and 30l will produce light detection signals a, b, c, d, e, f, g and h and i, j, k and l, respectively.

A read-out signal RF provided from the DVD light integration unit 5 is expressed as follows:

$$RF = a+b+c+d+e+f+g+h+i+j+k+l \quad (1)$$

Also, a focus error signal FE, necessary for focus servo control, is expressed as follows:

$$FE = \{(a+d+e+h)-(b+c+f+g)\} - \{(i+l)-(j+k)\} \quad (2)$$

Also, a heterodyne signal HTD used to detect a tracking error signal in the heterodyne method is expressed as follows:

$$HTD = \{(a+b+g+h)-(c+d+e+f)\} \quad (3)$$

The DVD light integration unit 5 further comprises a heterodyne detection circuit provided in the IC incorporated in the first semiconductor substrate 25 to detect a tracking error signal from a heterodyne signal HTD represented by the expression (3).

A pushpull signal PP used to detect a tracking error signal in the pushpull method is expressed as follows:

$$PP = \{(a+b+e+f)-(c+d+g+h)\} + \{(k+l)-(i+j)\} \quad (4)$$

The DVD light integration unit 5 has no pushpull offset correction circuit. Therefore, a pushpull signal provided from the DVD light integration unit 5 still contains an offset component.

Figure 8:
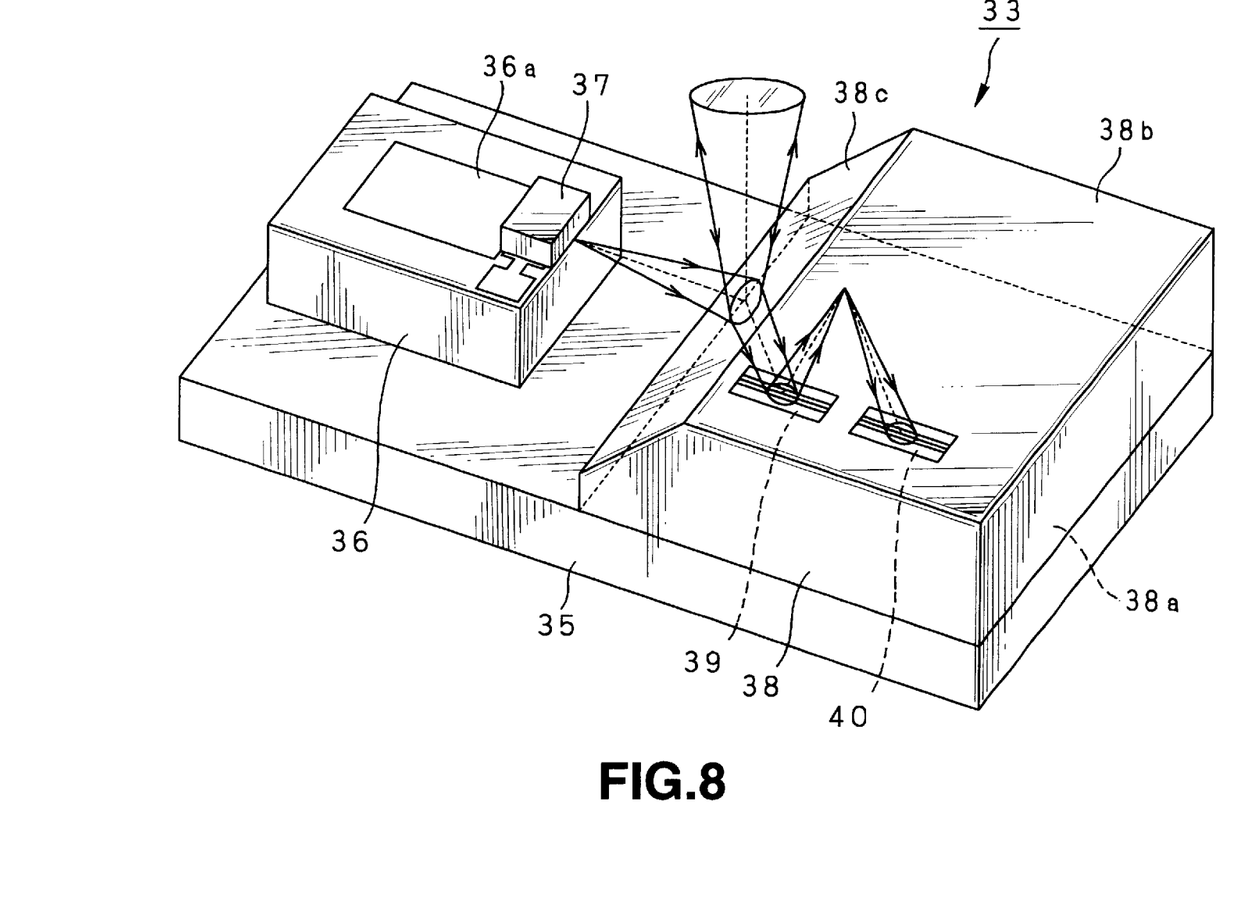
FIG. 8 is a perspective view of a light integration device for use in a CD-oriented light integration unit.

On the other hand, the CD light integration unit 6 has a light integration device 33 disposed inside a package sealed at the top surface thereof with a glass cover, as in the DVD light integration unit 5, as shown in FIG. 8.

As shown in FIG. 8, the light integration device 33 comprises a first semiconductor substrate 35, second semiconductor substrate 36 mounted on the first semiconductor substrate 35 and a semiconductor laser 37 mounted on the second semiconductor substrate 36.

The semiconductor laser 37 irradiates a laser light having a wavelength λ of 780 nm when writing or reading CD. The second semiconductor substrate 36 has a photodetector 36a provided therein to detect the intensity of a laser light irradiated from the back of the semiconductor laser 37. The CD light integration unit 6 adjusts the intensity of laser light irradiated from the semiconductor laser 37 based on the light intensity detected by the photodetector 36a.

Also a prism 38 is provided on the first semiconductor substrate 35 before the semiconductor laser 37. The prism 38 has a bottom surface 38a opposite to the first semiconductor substrate 35 and a top surface 38b opposite to the bottom surface 38a. The bottom and top surfaces 38a and 38b are parallel to each other. The top surface 38b has a light reflective layer provided thereon.

Of the prism 38, a surface upon which a laser light irradiated from the semiconductor laser 37 is incident is an optical path turning surface 38c inclined about 45° with respect to the optical axis of the laser light irradiated from the semiconductor laser 37. The optical path turning surface 38c has formed thereon a translucent layer made of a dielectric multi-layer film. The laser light irradiated from the semiconductor laser 37 is reflected by the optical path turning surface 38c having the translucent layer. The light reflected by the optical path turning surface 38c is irradiated onto the recording surface of CD through the wavelength-selective beam splitter 7, wavelength-selective diaphragm 8 and objective lens 9. A return part of the light reflected back from the recording surface of CD passes through the translucent layer and enters into the prism 38 from the optical path turning surface 38c.

The return light into the prism 38 from the optical path turning surface 38c first arrives at the bottom surface 38a of the prism 38. There is provided the translucent layer in the position where the return light from the optical path turning surface 38c is first incident. A photodetector 39 is provided below the translucent layer and above the first semiconductor substrate 35. Namely, the return part of the incident light into the prism 38 from the optical path turning surface 38c is partially passed through the translucent layer formed on the bottom surface 38a of the prism 38 and incident upon the first photodetector 39 while the rest of the return light part is reflected by the translucent layer towards the top surface 38b of the prism 38.

The return light reflected at the translucent layer formed on the bottom surface 38a of the prism 38 is reflected by the top surface 38b of the prism 38 on which a light reflective layer is formed, arrives at the bottom surface 38a of the prism 38 again, and travels from the bottom surface 38a of the prism 38 onto the first semiconductor substrate 35. There is provided on the upper surface of the first semiconductor substrate 35 a second photodetector 40 upon which the return light from the bottom surface 38a of the prism 38 is incident.

Figure 9A:
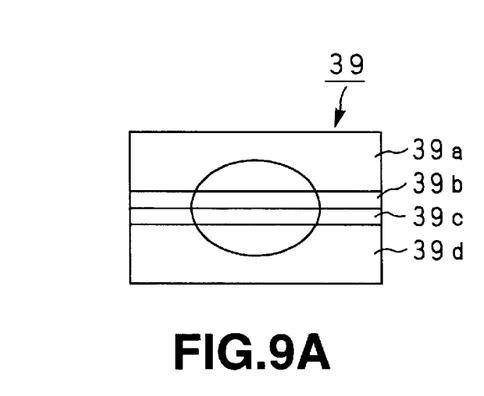
Figure 9B:
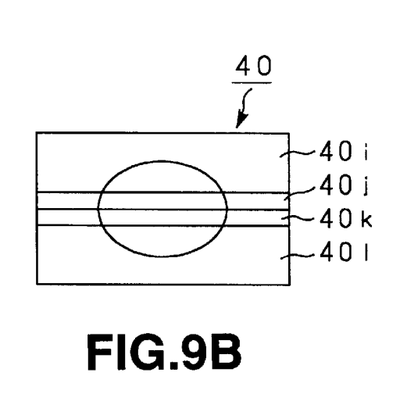

As shown in FIG. 9(A), the light-incident surface of the first photodetector 39 consists of fourt parts 39a to 39d. The light-incident surface of the second photodetector 40 is also formed from four parts 40i to 40l as shown in FIG. 9(B). Thus, each of such surface parts of the first and second photodetectors 39 and 40 generates a light detection signal corresponding to the intensity of an incident return light.

Further the CD light integration unit 6 incorporates in the first semiconductor substrate 35 thereof an IC which processes, in a predetermined manner, a light detection signal generated by the first and second photodetectors 39 and 40. In the CD light integration unit 6, the IC incorporated in the first semiconductor substrate 35 will process, in the predetermined manner, the light detection signal supplied from the first and second photodetectors 39 and 40 to generate a necessary signal for focus and tracking servo control. Also, the IC will generate a read-out signal when reading CD.

Assume here that the light-incident surface parts 39a, 39b, 39c and 39d and 40i, 40j, 40k and 40l will produce light detection signals a, b, c and d and i, j, k and l, respectively.

A read-out signal RF provided from the CD light integration unit 6 is expressed as follows:

$$RF = a+b+c+d+i+j+k+l \quad (5)$$

Also, a focus error signal FE, necessary for focus servo control, is expressed as follows:

$$FE = \{(a+d)-(b+c)\}-\{(i+l)-(j+k)\} \quad (6)$$

A pushpull signal PP used to detect a tracking error signal in the pushpull method is expressed as follows:

$$PP = \{(a+b)-(c+d)\}+\{(k+l)-(i+j)\} \quad (7)$$

The CD light integration unit 6 has a pushpull offset correction circuit to correct an offset, in a pushpull signal represented by the expression (7), due to a lens shift, disc radial skew or similar.

Next, detection of tracking error by the optical head 1 having the aforementioned construction will be discussed for DVD-ROM, recordable DVD and CD, respectively.

For DVD-ROM, the DVD light integration unit 5 is used as shown in FIG. 2. Namely, a light having a wavelength λ of 650 nm is irradiated from the semiconductor laser 27 provided in the DVD light integration unit 5 and a return part of the light from the DVD-ROM is detected by the photodetectors 29 and 30.

To detect a tracking error signal, the heterodyne method is used. Namely, a heterodyne signal HTD as represented by the expression (3) is determined and a tracking error signal is detected from the heterodyne signal HTD by the heterodyne detection circuit.

For recordable DVD, the DVD and CD light integration devices 5 and 6 are used as shown in FIG. 3. More particularly, a light having a wavelength λ of 650 nm is irradiated from the semiconductor laser 27 provided in the DVD light integration unit 5, and a return part of the light from the recordable DVD is detected by the photodetectors 29 and 30. Also, a light of 780 nm in wavelength λ is irradiated from the semiconductor laser 37 provided in the CD light integration unit 6 and a return part of the light from the recordable DVD is detected by the photodetectors 39 and 40. At this time, the pushpull signal PP detected by the DVD light integration unit 5 and a one PP detected by the CD light integration unit 6 are used for the tracking error signal detection.

Generally, a maximum limit of detection by the optical head can be represented by $\lambda/(2 \times NA)$ where λ is light wavelength and NA is numerical aperture of objective lens. When the CD light integration unit 6 is used, the wavelength λ is 780 nm and the numerical aperture (NA) of the objective lens 9 is 0.45, so that the maximum limit of detection by the CD light integration unit 6 is $0.78/(2 \times 0.45) = 0.87$ μm. The track pitch of DVD is 0.74 μm which is smaller than the maximum size of detection by the CD light integration unit 6. Therefore, when DVD is played, the CD light integration unit 6 will not detect any intensity modulation in the direction of the track and a pushpull signal PP detected by the CD light integration unit 6 will only contain an offset component. The offset component is almost same as the offset component contained in a pushpull signal PP detected by the DVD light integration unit 5.

In the optical head 1 according to the present invention, an offset component contained in a pushpull signal PP detected by the DVD light integration unit 5 is canceled with a pushpull signal PP detected by the CD light integration unit 6 and whose offset component is not corrected (namely, a signal containing only an offset component). The pushpull signal PP whose offset component is canceled in this way is used as a tracking error signal. Thereby, an offset component contained in a pushpull signal PP can be canceled without any pushpull offset correction circuit provided in the DVD light integration unit 5. Therefore, the optical head circuit can be simplified.

Also for recordable DVD, a light intensity modulation in the direction of the track can be obtained when reading the recordable DVD. Therefore, the heterodyne method may be used to detect a tracking error signal as with DVD-ROM.

For CD, the CD light integration unit 6 is used as shown in FIG. 4. The semiconductor laser 37 mounted in the CD light integration unit 6 irradiates a light having a wavelength $\lambda$ of 780 nm, and a return part of the light from the CD is detected by the photodetectors 39 and 40.

In this case, the pushpull method is used for detection of tracking error signal. A pushpull signal PP represented by the expression (7) is determined, and an offset component is canceled from the pushpull signal PP by the pushpull offset correction circuit provided in the CD light integration unit 6 to provide a tracking error signal.

In the aforementioned optical head 1 of the present invention, the heterodyne detection circuit provided in the DVD light integration unit 5 and the pushpull offset correction circuit provided in the CD light integration unit 6 render the optical disc 1 compatible with all of CD-ROM, CD-R, DVD-RAM and recordable DVD. Namely, the optical head 1 according to the present invention is compatible with a plurality of different types of optical discs but has only a simplified circuit configuration. Therefore, the optical head 1 is very advantageous for designing it compact and light-weight as well as for attaining a reduction of manufacturing costs.

The CD light integration unit 6 in the optical head 1 may be any one of the conventional CD light integration units currently available through the mass production. Thus, the optical head 1 according to the present invention is extremely advantageous for the reduction of manufacturing costs.

For recordable DVD, the CD light integration unit 6 does not detect any light intensity modulation in the direction of track but can only detect an offset component. Therefore, the spot of the laser light irradiated from the CD light integration unit 6 may be in any geometrical relationship with the spot of the laser light irradiated from the DVD light integration unit 5. Since the optical head 1 may be manufactured with not so high an accuracy of alignment as for the three-beam method for tracking error signal detection, the optical head 1 according to the present invention can be installed very easily.

In the optical head 1, the optical axes of two lights of different wavelengths coincide with each other. However, since the spot of a light having a shorter wavelength may be in any geometrical relationship with the spot of a light having a longer wavelength, the optical head 1 of the present invention may be designed with the optical axes of lights of different wavelengths deviated from each other.

Figure 10:
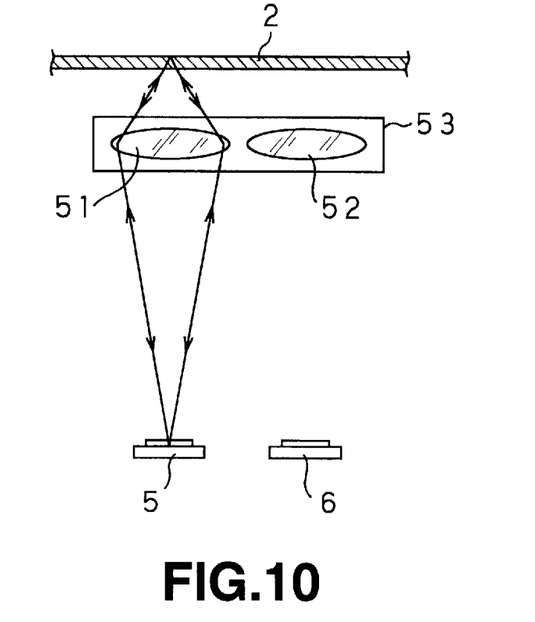
FIG. 10 shows another embodiment of the optical head according to the present invention, with the optical head in reading DVD-ROM.
Figure 11:
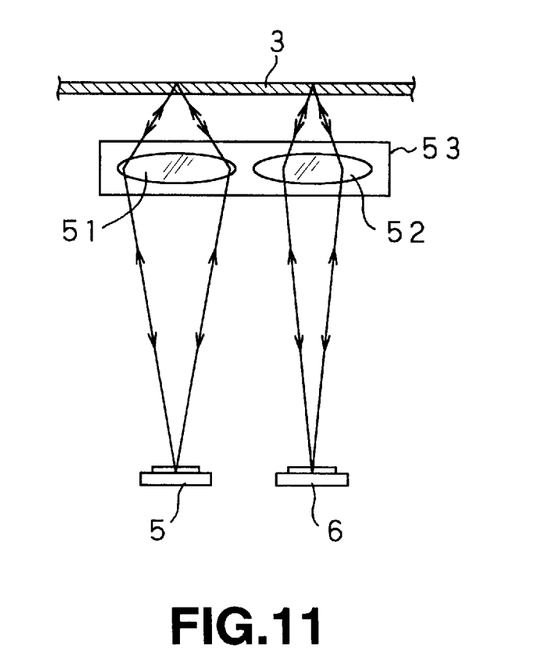
FIG. 11 shows the optical head in FIG. 10 in writing and reading a recordable DVD.
Figure 12:
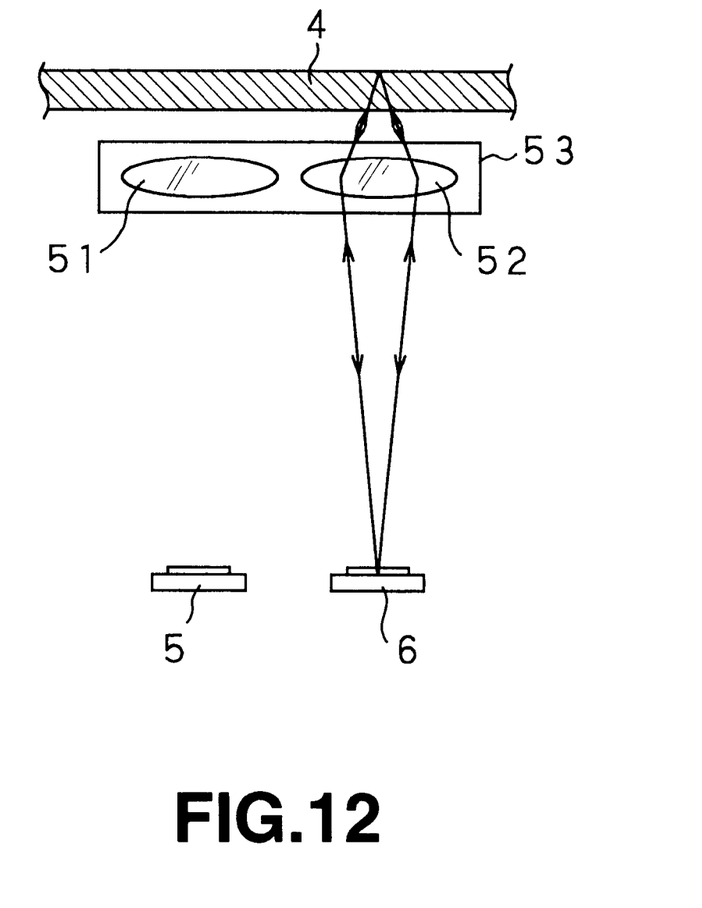
FIG. 12 shows the optical head in FIG. 10 in writing and reading a CD.

Namely, a tracking error signal can be detected as in the optical head 1 by using two objective lenses 51 and 52 for lights of different wavelengths, respectively, and fixing the objective lenses 51 and 52 on a same lens driving mechanism 53 so that they are moved together as shown in FIGS. 10 to 12.

FIG. 10 shows another embodiment of the optical head according to the present invention. The optical head is reading an optical disc 2 which is DVD-ROM as in FIG. 2. FIG. 11 shows the optical head in writing and reading an optical disc 3 which is recordable DVD as in FIG. 3. FIG. 12 shows the optical head in writing and reading an optical disc 4 which is CD as in FIG. 4.

As shown in FIGS. 10 to 12, when the dedicated objective lenses 51 and 52 are provided for lights of different wavelengths, respectively, the CD and DVD optical systems are independent of each other. So the wavelength-selective beam splitter 7 and wavelength-selective diaphragm 8 as used in the aforementioned optical head 1 are not required any longer.

As having been described in the foregoing, the present invention cancels an offset component of a pushpull signal detected by an optical system in which a light of a shorter wavelength is used, by another optical system in which a light of a longer wavelength is used. Therefore, the optical system using the light of the shorter wavelength needs no pushpull offset correction circuit, which will lead to a simplified circuit configuration of the optical head.

Namely, the present invention can detect capacity, with a simplified circuit configuration of the optical head, a tracking error signal from each of a plurality of different types of recording media desired for a high recording density and large storage.

What is claimed is:

1. An optical recording and/or reproducing apparatus in which light beams of first and second wavelengths are irradiated towards a first information recording medium and at least one return light from the first information recording medium is detected, comprising:

a first optical system for reading and/or writing first information with respect to a first information recording medium and a second optical system for reading second information from a second information recording medium, said first optical system having a first returned light beam photodetector and a first photoemitter, said first photoemitter irradiating a first irradiated light beam towards said first information recording medium and detecting a first returned light beam, said first irradiated light beam having a first irradiation intensity and said first wavelength, said first returned light beam being said first irradiated light beam reflected from said first information recording medium to read first information from said first information recording medium, said first returned light beam photodetector detecting said first returned light beam to generate a first pushpull signal, said first pushpull signal having a first offset component, said second optical system having a second returned light beam photodetector and a second photoemitter, said second photoemitter irradiating a second irradiated light beam towards said first information recording medium and detecting a second returned light beam, said second irradiated light beam having a second irradiation intensity and said second wavelength, said second returned light beam being said second irradiated light beam reflected from said first information recording medium, said second information from said second information recording medium being readable with said second irradiated light beam, said second returned light beam photodetector detecting said second returned light beam to generate a second signal, said second signal canceling said first offset component from said first pushpull signal to generate a tracking error signal, wherein said first optical system further comprises a first irradiated light beam photodetector, said first irradiated light beam photodetector detecting a first intensity-adjustment light beam irradiated from said first photoemitter, said first intensity-adjustment light beam having a first adjustment intensity, said first radiation intensity being adjusted based on said first adjustment intensity detected by said first irradiated light beam photodoctor, and wherein said second optical system further comprises a second irradiated light beam photodetector, said second irradiated light beam photodetector detecting a second intensity-adjustment light beam irradiated from said second photoemitter, said second intensity-adjustment light beam having a second adjustment intensity, said second radiation intensity being adjusted based on said second adjustment intensity detected by said second irradiated light beam photodoctor.

2. The optical head as set forth in claim 1, wherein said first irradiated light beam and said second irradiated light beam each pass through an objective lens.

3. The optical head as set forth in claim 1, wherein said second wavelength is of about 780 nm and said first wavelength is of about 650 nm or 635 nm.

4. The optical head as set forth in claim 1, wherein said first irradiated light beam passes through a first objective lens and said second irradiated light beam passes through a second objective lens.

5. The optical head as set forth in claim 1, wherein said second wavelength is shorter than said first wavelength.

6. The optical head as set forth in claim 1, wherein one of said first and second information recording media is a digital video disc (DVD) and the other of said second information recording media is a compact disc (CD).

7. The optical head as set forth in claim 1, wherein:
said first information is readable by modulating said first irradiated light beam to produce said first returned light beam, said first returned light beam being said first modulated light beam, second information is readable from said second information recording medium by modulating said second irradiated light beam to produce said second modulated light beam.

8. The optical head as set forth in claim 1, wherein
said first photoemitter and said first irradiated light beam photodetector being integrated on a first photoemitter semiconductor substrate, said first photoemitter semiconductor substrate being on and adjacent a first main substrate, said first returned light beam photodetector being incorporated within said first main substrate.

9. The optical head as set forth in claim 8, wherein said first photoemitter semiconductor substrate is in contact with said first main substrate.

10. The optical head as set forth in claim 1, said second photoemitter and said second irradiated light beam photodetector being integrated on a second photoemitter semiconductor substrate, said second photoemitter semiconductor substrate being on and adjacent a second main substrate, said second returned light beam photodetector being incorporated within said second main substrate.

11. The optical head as set forth in claim 10, wherein said second photoemitter semiconductor substrate is in contact with said second main substrate.

12. The optical head as set forth in claim 1, wherein said second returned light beam photodetector detects said second returned light beam to generate a second offset component as said second signal, said second offset component canceling said first offset component to generate a tracking error signal.

13. The optical head as set forth in claim 1, wherein said first optical system uses a heterodyne signal to detect a tracking error.

* * * * *